Patented Oct. 3, 1939

2,174,684

UNITED STATES PATENT OFFICE 2,174,684

DECOMPOSITION OF ALUNITE

Frank K. Cameron, Chapel Hill, N. C., Ernest O. Huffman, Kingsport, Tenn., and Joseph A. Taylor, Chapel Hill, N. C.

No Drawing. Application September 9, 1936, Serial No. 100,036

13 Claims. (Cl. 23—141)

This invention relates to a novel process for the recovery of the values in alunite and more particularly to an efficient process for the recovery of alumina and alkali sulfate from alunite.

The mineral alunite, probably

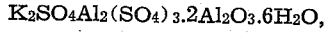

$K_2SO_4Al_2(SO_4)_3.2Al_2O_3.6H_2O$, large deposits of which exist in various parts of the world, represents a potential source of raw material for the production of alumina ($Al_2O_3$). A number of methods have been suggested for decomposing alunite, but these have all had more or less serious commercial disadvantages. One such method comprises roasting the alunite, leaching the roast, and recovering potassium sulfate from the leachings by evaporation and crystallization. But the highly heated alumina residue has no commercial value, thus rendering the process inefficient. Another method in use heretofore comprises heating alunite with concentrated sulfuric acid, leaching the resulting roast, and separating potash alum. Ammonia alum may be recovered from the mother liquor by addition of ammonia. This method limits the recovery to potash and ammonia alums which is a commercial disadvantage and the method is expensive due to the cost of the relatively large quantities of sulfuric acid necessary.

Heretofore there has been no method for the commercial recovery of both alumina and alkali sulfates from alunite in one process. Therefore one of the objects of the present invention is to furnish a process for the decomposition of alunite to compounds from which it is commercially feasible to recover alumina and alkali sulfates.

More specifically, one of the objects of the present invention is to furnish a process for decomposing alunite to aluminates and sulfates in such condition that alumina and alkali sulfates can be recovered from them in a commercially satisfactory manner.

A further object of this invention is to furnish a complete and chemically efficient process for the recovery of alumina, alkali sulfate and alkali carbonate from alunite.

In order to obviate the disadvantages inherent in the prior art methods of treating alunite we have developed a process which is adapted to recover from alunite not only alumina but also alkali sulfate and alkali carbonate. Briefly, our process comprises the steps of heating pulverized alunite with an alkali sulfide, or with an alkali sulfate and a carbonaceous material which will reduce the sulfate to a sulfide, leaching the roast, precipitating alumina from the leach liquor, and separating alkali sulfate and alkali carbonate from the remaining mother liquor. In the heating or roasting operation, the amount of added alkali metal sulfide (or the like) in the mix affords alkali metal for the reactions when the alunite is decomposed, particularly for converting the alumina therefrom to alkali metal aluminate, as far as practicable. With enough of this added alkali metal going into the formation of aluminate, a certain amount of alkali metal from the alunite itself may remain combined with sulfur in the roast, and may be ultimately recovered as sulfate or carbonate,—in addition to an amount of alkali metal compound equivalent to that which was added to the alunite. The presence of alkali metal sulfide during the heating assists or favors reaction as desired, breaking down the alunite efficiently and transforming the alumina and the alkali metal therefrom into soluble aluminate and soluble alkali metal sulfur compound(s) in the resulting roast. As shown by specific examples of the process given hereinafter, an absolute excess of alkali metal sulfide is decidedly advantageous: i. e., an amount which, with the alunite itself, affords an excess of alkali metal over that in the amount of alkali aluminate corresponding to the alumina from the alunite. There are special advantages in supplying alkali metal through the form of alkali metal sulfide, rather than other forms.

We have discovered that when alunite is heated with an alkali sulfide, in sufficient amount, the reaction products are essentially aluminates and sulfates, and that these compounds are in a condition making it commercially practical to separate alumina and alkali sulfates from them. Alkali sulfides are not readily available in the vicinity of alunite deposits but sodium sulfate is available at a low cost, and can be utilized for the production of sodium sulfide by reduction with carbonaceous materials such as finely divided coal. However, where sodium sulfide is first made from sodium sulfate by reduction and then heated with alunite in a separate step, the consumption of coal is excessive. We have, therefore, developed a process whereby the reduction of sodium sulfate to sodium sulfide and the heating of this sodium sulfide with alunite is carried out in one step.

By virtue of a number of experiments, we have determined that the optimum conditions for the decomposition of alunite by fusion with sodium sulfide differ from the optimum conditions for the reduction of sodium sulfate to sodium sulfide. However, we have determined compromise conditions which make it possible to obtain in one heating step substantially high decompositions of the alunite and at the same time effect a satisfactory reduction of the sodium sulfate. These conditions include a temperature of 850–900° C. for about three hours in a covered container, preferably a rotary kiln. Also, as will appear from the examples hereinafter, an excess of alkali metal sulfate and carbon is advantageous, just as when the alkali metal sulfide is used. The coal used for the reaction is preferably one hundred mesh with as low a silica content as possible. The presence of silicates as contaminations either in the alunite or in the coal is particularly undesirable. In fact the advantageous results of the process of the present invention cannot be achieved if silicates are present in appreciable amounts.

The melt or sinter hereinafter referred to as "roast" is soluble in water, each gram weight of the roast requiring about 2.7 grams of water at 25° C. and about 1.6 grams of water at 100° C. Alumina is obtained from the dissolved roast by precipitation, preferably at about 100° C., with carbon dioxide or a mixture of carbon dioxide and sulfur dioxide. These gases are obtainable as by-products of the roasting operation. Sodium bicarbonate, convertible to sodium carbonate, may be obtained from the mother liquor by concentrating it and introducing carbon dioxide to saturation. Glauber's salts ($Na_2SO_4 10H_2O$) may be crystallized by cooling the residue to 32.4° C. after removal of the sodium bicarbonate. The residue after crystallization contains potassium salts and may be added to alunite for subsequent roastings.

Pure potassium sulfate may be recovered by heating alunite with potassium sulfate and a carbonaceous material such as powdered coal. The roast so obtained is dissolved in water and alumina is precipitated by the introduction of carbon dioxide or a mixture of carbon dioxide and sulfur dioxide. The mother liquor is composed principally of potassium sulfate, potassium carbonate and oxy-sulfur compounds of potassium. The latter compounds may be converted to potassium sulfate by introducing air or by heating. Potassium sulfate may then be precipitated by evaporating the mother liquor until its boiling point is 136.5° C. and its specific gravity is 1.64 at 100° C. The potassium sulfate so obtained is then washed. Potassium carbonate may be recovered from the remaining solution by concentration.

We have found that the recovery of potassium in this process is practically 100%, and in any event, where potassium sulfate is used to decompose the alunite, losses can be replaced by a portion of the potassium salt recovered from the alunite itself. We have also found that the potassium sulfate of this process may be partly replaced with potassium carbonate in the roasting operation. This is an advantage because the solution remaining after the alumina has been precipitated from the dissolved roast may be treated so as to yield substantially pure potassium sulfate and potassium carbonate as described above. Either one of these products may be marketed. It is, therefore, apparent that the process has the two-fold advantage of being flexible and also self-contained. It is flexible because either pure potassium sulfate or pure potassium carbonate may be marketed in addition to the alumina, and it is self-contained because the supply of potassium salt for any given roast after the first may be obtained from the preceding roast after an amount equivalent to that in the alunite has been set apart. Small mechanical losses may be made up from the potassium salts produced from the alunite.

The following examples will serve to illustrate specific embodiments of the process which is the subject of this invention.

Example 1

Pulverized alunite is mixed with about an equal weight of potassium sulfide and heated to approximately 700° C. for one hour. The roast so obtained is leached with water to obtain a liquid which is composed essentially of aluminates and sulfates. A mixture of the gases evolved in the roasting operation, consisting principally of sulfur dioxide and carbon dioxide, is then passed through the leach liquor causing a precipitation of alumina. During the latter part of this precipitation step the sulfur dioxide content of the gases coming from the roasting operation is preferably decreased. This obviates the possibility of redissolving the alumina in the liquor, by an excess of sulfur dioxide. The precipitated alumina is then removed and the remaining mother liquor is concentrated by evaporation to a density of 1.63 at 100° C. to a degree where the boiling point is about 136.5° C., when practically all of the potassium sulfate will have separated as a crystalline mass. Adhering mother liquor containing potassium carbonate is removed by washing with cold water, a saturated solution of potassium sulfate, or a dilute solution of sulfuric acid. The aqueous residue consisting principally of potassium carbonate, potassium sulfite and a small proportion of potassium sulfate is concentrated. Potassium carbonate may be recovered from the concentrate or the entire concentrate may be advantageously mixed with a fresh batch of alunite for roasting.

Example 2

Pulverized alunite is mixed with about 2½ to 3 times its weight of potassium sulfate and 1 to 2 times its weight of powdered coal and roasted from 2 to 3 hours at 850–900° C. The roast is leached with water and the alumina precipitated from the liquid so obtained as in Example 1. Similarly potassium sulfate is obtained from the mother liquor by evaporation as in Example 1 and the residue is treated as in Example 1.

Example 3

Pulverized alunite is mixed with about 90% of its weight of sodium sulfide and heated for about 1½ hours at 725° C. The addition of sodium chloride in an amount equivalent to 10% by weight of the sodium sulfide facilitates the reactions taking place during the roasting. The roast so obtained is leached with water and an aqueous solution consisting essentially of aluminates and sulfates is obtained. Alumina is precipitated from this aqueous solution as in Example 1. The mother liquor is concentrated and cooled to 23° C. at which temperature carbon dioxide is introduced to saturation. A large proportion of the sodium is thus precipitated as sodium bicarbonate which is removed and the remaining solution is evaporated until solids begin to appear at which time it is cooled to 32.4° C. and seeded with Glauber's salts. The solution remaining after the crystallized Glauber's salts have been removed will yield salts of sodium and potassium by fractional crystallization. A salt mixture rich in potassium can be obtained by desiccation or the solution may be mixed with pulverized alunite for a subsequent roast.

Example 4

Pulverized alunite is mixed with about twice its weight of sodium sulfate and a little more than its weight of coal and roasted for about 3 hours at 850-900° C. The addition of sodium chloride in an amount equivalent to about 10% by weight of the sodium sulfate facilitates the reactions taking place during the roasting. The roast so obtained is leached with water and the procedure of Example 3 is followed for the recovery of alumina, sodium bicarbonate and sodium sulfate.

Example 5

Pulverized alunite is mixed with about an equal weight of potassium sulfate, an equal weight of potassium carbonate and about half its weight of powdered coal. This mixture is then heated to about 900° C. for 3 hours. The roast so obtained is leached with water and alumina and potassium sulfate recovered from the liquid as in Example 1. The residue is then treated as in Example 1.

The present invention has many advantages over the processes heretofore proposed but the principal advantage is that the process which is the subject of this invention represents a practical and commercially efficient method for the decomposition of alunite and the recovery of its values. The satisfactory commercial aspect of the process is derived from a number of factors including availability and low price of the necessary raw materials, efficiency of recovery coupled with a self-contained process, and flexibility with respect to the compounds produced.

While the features herein described constitute preferred embodiments of this invention, it is to be understood that the invention is not limited to these precise features and that changes may be made therein without departing from the scope of the invention which is defined in the claims appended hereto. In these claims, the words "compound" (in such expressions as "alkali metal compound" or "alkali metal sulfur compound") and "reagent" are used as consistent with the fact that the compound or reagent may comprise either a single substance of the character referred to, or more than one such substance.

Having thus described our invention, we claim:

1. A process of decomposing and converting alunite into soluble substances, and producing alumina and alkali metal salt therefrom, by treating the alunite in a mix thereof with added material containing alkali metal and sulfur components, and present in such amount that the alkali metal thereof, with the alkali metal of the alunite, is more than sufficient to combine the alumina of the alunite to form alkali metal aluminate, said added material aforesaid including alkali metal and sulfur components embodied in material of the group consisting of, to wit, alkali metal sulfide, and a mixture of components of such character that on heating alkali metal sulfide is produced by their interaction; said process comprising heating the aforesaid mix of alunite and added material containing or affording alkali metal sulfide during the heating until with the assistance of this alkali metal sulfide a correspondingly thorough break-down of the alunite and transformation of the alumina and the alkali metal therefrom into soluble alkali metal aluminate and soluble alkali metal sulfur compound is effected in the resulting roast, and thereafter leaching the roast and treating the leach liquor with reagent for precipitating alumina from the alkali metal aluminate and forming soluble salts of its alkali metal, in addition to the soluble alkali metal compound representing the aforesaid alkali metal sulfur compound in the roast; all so that the production of soluble alkali metal compound is more than equivalent to the amount of alkali metal compound added to the alunite.

2. A process of decomposing and converting alunite into soluble substances, and producing alumina and alkali metal salt therefrom, by treating the alunite in a mix thereof with added material containing alkali metal and sulfur components, and present in such amount that the alkali metal thereof, with the alkali metal of the alunite, is more than sufficient to combine with the alumina of the alunite to form alkali metal aluminate, said added material aforesaid including alkali metal and sulfur components embodied in material of the group consisting of, to wit, alkali metal sulfide, and a mixture of components of such character that on heating alkali metal sulfide is produced by their interaction; said process comprising heating the aforesaid mix of alunite and added material containing or affording alkali metal sulfide during the heating until with the assistance of this alkali metal sulfide a correspondingly thorough break-down of the alunite and transformation of the alumina and the alkali metal therefrom into soluble alkali metal aluminate and soluble alkali metal sulfur compound is effected in the resulting roast, and thereafter leaching the roast and treating the leach liquor with gas comprising both sulfur dioxide and carbon dioxide.

3. A process in accordance with claim 2 wherein the sulfur dioxide content in the gas for treating the leach liquid is decreased during the treatment of the liquor, thus avoiding redissolution of the alumina in the liquor, while completing the precipitation of alumina by means of the carbon dioxide.

4. A process of decomposing and converting alunite into soluble substances, and producing alumina and alkali metal salt therefrom, by treating the alunite in a mix thereof with added material containing alkali metal and sulfur components, and present in such amount that the alkali metal thereof, with the alkali metal of the alunite, is more than sufficient to combine with the alumina of the alunite to form alkali metal alumiate, said added material aforesaid including alkali metal and sulfur components embodied in material of the group consisting of, to wit, alkali metal sulfide, and a mixture of components of such character that on heating alkali metal sulfide is produced by their interaction; said process comprising heating the aforesaid mix of alunite and added material containing or affording alkali metal sulfide during the heating until with the assistance of this alkali metal sulfide a correspondingly thorough break-down of the alunite and transformation of the alumina and the alkali metal therefrom into soluble alkali metal aluminate and soluble alkali metal sulfur compound is effected in the resulting roast, and thereafter leaching the roast and passing the sulfur dioxide evolved in the heating operation into the leach liquor, thereby liberating alumina and forming alkali metal sulfur compound from the aluminate.

5. A process of decomposing and converting alunite into soluble substances, and producing alumina and alkali metal salt therefrom, by treating the alunite in a mix thereof with added material containing alkali metal and sulfur components, and present in such amount that the alkali metal thereof, with the alkali metal of the alunite, is more than sufficient to combine with the alumina of the alunite to form alkali metal aluminate, said added material aforesaid including alkali metal and sulfur components embodied in material of the group consisting of, to wit, alkali metal sulfide, and a mixture of components of such character that on heating alkali metal sulfide is produced by their interaction; said process comprising heating the aforesaid mix of alunite and added material containing or affording alkali metal sulfide during the heating until with the assistance of this alkali metal sulfide a correspondingly thorough breakdown of the alunite and transformation of the alumina and the alkali metal therefrom into soluble alkali metal aluminate and soluble alkali metal sulfur compound is effected in the resulting roast, and thereafter leaching the roast and passing the sulfur dioxide and carbon dioxide evolved in the heating operation into the leach liquor.

6. A process of decomposing and converting alunite into soluble substances, and producing alumina and alkali metal salt therefrom, by treating the alunite in a mix thereof with added material containing alkali metal and sulfur components, and present in such amount that the alkali metal thereof, with the alkali metal of the alunite, is more than sufficient to combine with the alumina of the alunite to form alkali metal aluminate, said added material aforesaid including alkali metal and sulfur components embodied in material of the group consisting of, to wit, alkali metal sulfide, and a mixture of components of such character that on heating alkali metal sulfide is produced by their interaction; said process comprising heating the aforesaid mix of alunite and added material containing or affording alkali metal sulfide during the heating until with the assistance of this alkali metal sulfide a correspondingly thorough break-down of the alunite and transformation of the alumina and the alkali metal therefrom into soluble alkali metal aluminate and soluble alkali metal sulfur compound is effected in the resulting roast.

7. A process in accordance with claim 6 wherein the added material there referred to comprises alkali metal sulfate and carbonaceous matter for reducing it to alkali metal sulfide.

8. A process in accordance with claim 6 wherein the added material there referred to includes alkali metal sulfate and carbonaceous matter for reducing it to alkali metal sulfide, and also an amount of alkali metal carbonate comparable to the amount of alkali metal sulfate.

9. A process in accordance with claim 6 wherein the alkali metal sulfide there referred to is potassium sulfide.

10. A process in accordance with claim 6 wherein the alkali metal sulfide there referred to is sodium sulfide.

11. A process in accordance with claim 6 wherein the alkali metal sulfide there referred to is sodium sulfide, and wherein sodium chloride amounting to a minor proportion of this sodium sulfide is also included in the added material.

12. A process of decomposing alunite by heating it with an excess of alkali metal sulfide, which with the alunite itself affords an excess of alkali metal over that in an amount of alkali metal aluminate corresponding to the alumina from the alunite, so that reaction takes place and is completed in the presence of the sulfide, accomplishing a correspondingly efficient breakdown of the alunite and transformation of the alumina and the alkali metal therefrom into soluble alkali metal aluminate and soluble alkali metal sulfur compound in the resulting roast.

13. A process in accordance with claim 12 wherein the alkali metal sulfide there referred to is provided by adding to the alunite alkali metal sulfate and carbonaceous matter for reducing it to alkali metal sulfide.

FRANK K. CAMERON.
          ERNEST O. HUFFMAN.
          JOSEPH A. TAYLOR.